United States Patent [19]
Davis

[11] Patent Number: 5,805,245
[45] Date of Patent: Sep. 8, 1998

[54] MULTILAYERED DISPERSED THERMOCHROMIC LIQUID CRYSTAL

[75] Inventor: Frederick Davis, Livermore, Calif.

[73] Assignee: Davis Liquid Crystals, Inc., San Leandro, Calif.

[21] Appl. No.: 939,264

[22] Filed: Sep. 29, 1997

Related U.S. Application Data

[63] Continuation of Ser. No. 525,494, Sep. 19, 1995, abandoned.

[51] Int. Cl.$^6$ .......................... G02F 1/133; G02F 1/1333; G02F 1/13
[52] U.S. Cl. .............................. 349/20; 349/86; 349/185; 359/288
[58] Field of Search ................................ 359/43, 52, 51, 359/103, 241, 242, 288, 289; 349/20, 86, 89, 182, 185, 186; 345/106

[56] References Cited

U.S. PATENT DOCUMENTS

| | | | |
|---|---|---|---|
| 3,619,254 | 11/1971 | Davis | 428/1 |
| 3,831,165 | 8/1974 | Chivian et al. | 359/289 |
| 3,969,264 | 7/1976 | Davis | 349/86 |
| 4,022,706 | 5/1977 | Davis | 428/1 |
| 4,425,161 | 1/1984 | Shibahashi et al. | 106/21 |
| 4,435,047 | 3/1984 | Fergason | 349/86 |
| 4,741,859 | 5/1988 | McDonnell et al. | 349/185 |
| 4,834,500 | 5/1989 | Hilsum et al. | 349/20 |
| 4,952,033 | 8/1990 | Davis | 349/20 |
| 5,058,999 | 10/1991 | Davis | 349/20 |
| 5,124,819 | 6/1992 | Davis | 349/92 |
| 5,202,677 | 4/1993 | Parker et al. | 349/21 |
| 5,223,958 | 6/1993 | Berry | 349/20 |
| 5,491,420 | 2/1996 | Parker | 349/199 |
| 5,525,430 | 6/1996 | Chahroudi | 359/289 |
| 5,526,148 | 6/1996 | Moffat et al. | 349/20 |
| 5,597,361 | 1/1997 | Hope | 473/237 |

OTHER PUBLICATIONS

Instruction booklet entitled, "Liquid Crystals for Thermal Non–destructive Testing and Thermal Mapping: Materials, Techniques and Consulting," Davis Liquid Crystals, Inc.
Information sheet entitled, "A Multilayered Dispersed Thermochromic Liquid Crystal," Davis Liquid Crystals, Inc.
Davis, Frederick, "Liquid Crystals: A New Tool for NDT," *Research/Development*, pp. 24–27 (Jun., 1967).
Fergason, James L., "Substances that behave mechanically as liquids yet exhibit many of the optical properties of crystals have been known for more than 70 years. Their technological possibilities are just beginning to be explored," *Scientific American*, 211(2):77–85 (Aug., 1964).
Kirk–Othmer, "Liquid Crystalline Materials," *Encyclopedia of Chemical Technology* (*Fourth Edition*), 15:372–407 (1995).
Verbit, Lawrence, "Liquid Crystals—Synthesis and Properties," *J. of Chemical Education*, 49(1):36–39 (Jan., 1972).

*Primary Examiner*—William L. Sikes
*Assistant Examiner*—Toan Ton
*Attorney, Agent, or Firm*—Townsend and Townsend and Crew LLP

[57] ABSTRACT

A multilayered thermochromic display system is provided, wherein a thermochromic substance is applied to inert films in stacked layers with a non-invasive barrier between each layer of thermochromic substance. The thermochromic substance in each layer responds in a different temperature range so that as the temperature changes, the display exhibits repeated sequences of colors. The use of multiple layers with different temperature sensitivities enables the use of the displays over a broad range of temperatures.

19 Claims, 1 Drawing Sheet

MULTILAYERED DISPERSED THERMOCHROMIC LIQUID CRYSTAL

This is a Continuation of application Ser. No. 08/525,494, filed Sep. 19, 1995, now abandoned, the disclosure of which is incorporated by reference.

BACKGROUND OF THE INVENTION

1. Field of the Invention

This invention provides for a stacked thermochromic display system. The preferred system uses liquid crystals that are dispersed in films which are stacked in planar layers to enable use of the liquid crystal films at a variety of temperatures.

2. Background of the Invention

Because they reversibly change color with changes of temperature, thermochromic displays have found wide use as indicators of temperature. The most commonly utilized thermochromic substances used in displays are cholesteric liquid crystals, sometimes known as twisted nematic liquid crystals. These crystals are extremely optically active and exhibit brilliant iridescent colors when exposed to various environmental changes such as temperature, pressure, electric fields or radiation.

Methods of applying dispersed thermochromic substances to films and other supports so that they retain their natural brilliance have been developed. Because each substance changes color in a limited temperature range, if a broader range of temperatures is to be encountered, two or more different thermochromic substances in a display must be used. However, two dispersions of thermochromic substances placed adjacent to or on top of each other will eventually mix and an unwanted color play between the thermochromic substances will result. To date, the solution to using thermochromic substances to detect a range of temperatures was to place the thermochromic substances responsive to the desired temperatures adjacent to each other, separated by a space. This invention solves the problem of color play by placing a non-invasive transparent layer between two or more layers of dispersed liquid crystals. The non-invasive barrier can be a liquid film forming coating, a lamination with or without adhesive, or any other transparent layer that will not attack the dispersed liquid crystals.

3. Description of the Prior Art

U.S. Pat. Nos. 3,697,297 and 3,732,119 disclose methods of encapsulation of liquid crystals. U.S. Pat. No. 3,600,060 uses water soluble film forming polymers and emulsifies liquid crystals in an aqueous medium. U.S. Pat. No. 3,620,889 incorporates liquid crystals in a clear plastic resin from a solution of the resin in an aromatic hydrocarbon solvent. U.S. Pat. Nos. 3,655,971, 3,663,390, and 3,666,948 use various forms of electromagnetic radiation to form images on films of liquid crystal compositions. U.S. Pat. No. 4,022,706 discloses methods of making thin, stable and substantially uniform liquid crystal containing films by coating a liquid crystal containing ink onto an inert substrate.

SUMMARY OF THE INVENTION

A multilayered thermochromic display system is provided, wherein a thermochromic substance, preferably cholesteric or twisted nematic liquid crystals, is applied to inert films in stacked layers with a non-invasive barrier between each thermochromic substance. The thermochromic substance in each layer responds in a different temperature range so that as the temperature changes, each layer repeats a similar sequence of colors.

The multilayered display system comprises a substrate, preferably a water based acrylic copolymer formulation coated or permeated with a black pigment, and alternating layers of a thermochromic film containing a thermochromic substance and a transparent inert film or non-invasive barrier, preferably water based, e.g., latex formulation, which serves as a protective coating for the thermochromic film and as a support for the next layer of the thermochromic substance.

BRIEF DESCRIPTION OF THE DRAWINGS

The manner in which the invention can be implemented and the advantages which derive therefrom will emerge more clearly from the exemplary embodiments which follow and which are given by way of illustration and as non-limiting examples with reference to the attached figures in which:

FIG. 1 presents two different views of a stacked thermochromic display.

DESCRIPTION OF THE PREFERRED EMBODIMENT

1. Definitions

Figure 1A:
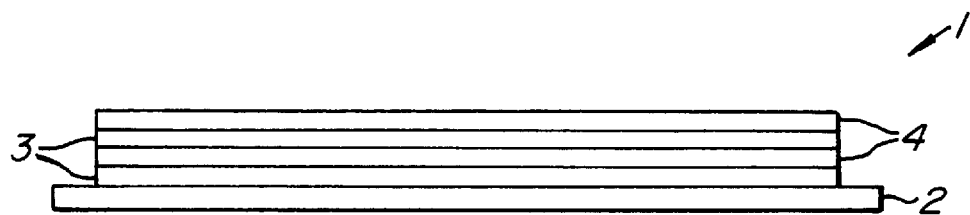
FIG. 1A represents a side view of the display having two thermochromic film layers and two transparent barriers on a substrate.

"Acrylic copolymers" are polymeric compounds wherein one of the species of the monomers is an acrylic acid (prop-2-enoic acid) or a derivative thereof (methacrylic acid). It also includes polymers of a single species.

"Barrier" means a transparent inert coating or film used to protect the liquid crystal film layer. When stacks of thermochromic film layers are present, the barrier of a lower film layer will serve as the substrate of an upper film layer.

"Cholesteric liquid crystals" or chiral nematic liquid crystals refer to a subset of nematic liquid crystals in which many of the compounds are derivatives of cholesterol. Cholesteric liquid crystals are extremely optically active, more than can be accounted for by the rotary power of the compounds. The compounds have a natural screw structure in which there exists a chiral center that acts to bias the direction of the liquid crystal with a cumulative twist that is not imposed artificially.

"Display" means a barrier, a thermochromic film layer and either a substrate (lower display) or the barrier of another display (upper displays).

"Film-forming polymer" refers to a formulation capable of forming a film after water or other liquid is removed.

"Generally planar" means having a longer x and y axis relative to a z axis where the z axis is perpendicular to both the x and y axis.

"Liquid crystal film layer" means the dried liquid crystal ink applied to the substrate or support.

"Liquid crystal ink" refers to a mixture comprising the liquid crystals, a solvent to dissolve the liquid crystals, a thickening agent, a film-forming polymer, preferably latex and optionally a wetting agent.

"Microencapsulated" means surrounded by a gelatin shell or other water soluble polymeric materials.

"Nematic liquid crystals" refer to thermochromic liquid crystals in which the long axes of the molecules remain substantially parallel but in which the positions of the centers of mass are more disorganized (random) than in the smectic liquid crystals. Nematic liquid crystals include ordinary nematic structures, cytotactic nematic structures, and cholesteric neumatic structures.

"Polyester" refers to a range of polymers formed by the condensation polymerization of polyhydric alcohols and polycarboxylic acids or anhydrides. Maleic and fumaric (i.e., ethene 1,2-dicarboxylic) acids and ethylene and propyl alcohol are the usual starting materials.

"Stacked displays" means a generally planar stack of displays, each display containing a thermochromic substance responsive to different temperature changes.

"Substrate" means the bottom-most support to which the thermochromic dye is applied.

"Support" means a solid material to which the thermochromic or liquid crystal film layer is applied. The support can be the substrate or the barrier of a lower display.

"Thermochromic film layer" means the dried thermochromic dye applied to the substrate or support.

"Thermochromic liquid crystals" refer to thermotropic compounds inclusive of smectic or nematic liquid crystals or any other liquid crystals that change color with a change in temperature.

"Thermochromic liquid crystal solution" refers to liquid crystals and solvent to dissolve the crystals.

"Thermochromic ink" refers to a mixture comprising a thermochromic substance, a solvent to dissolve the thermochromic dye, a thickening agent, a film-forming polymer and optionally a wetting agent.

"Thermochromic substance" means a compound that changes color in response to a change in temperature.

2. Detailed description of the invention

Figure 1B:
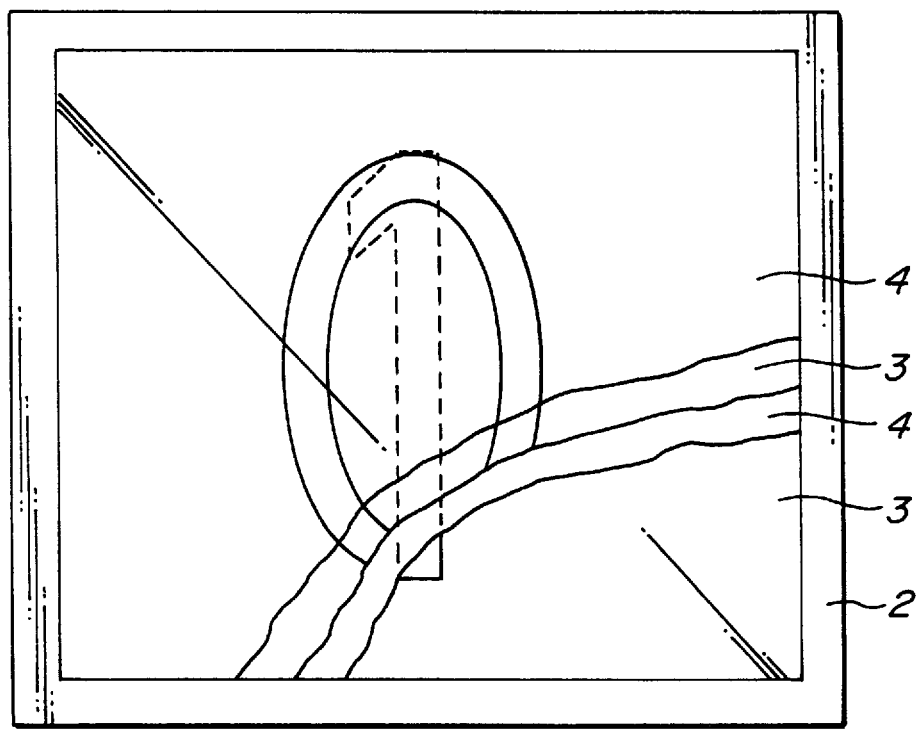
FIG. 1B is a top view of the same display with the numerals 1 and 0.

Novel multilayered dispersed thermochromic display systems are provided as in FIG. 1, having a substrate layer (2) and each display comprising a thermochromic film layer (3) and a non-invasive barrier (4). The stacked displays (1) will be more than one layer and may have three or more layers depending upon the particular application. The generally planar displays are stacked with the barrier of a lower display providing the support for the thermochromic film layer of next display. The displays exhibit color at temperatures between 0° and 100° C.

The displays are stacked such that each display is responsive in a different temperature range. Preferably, the temperature response ranges of each display overlap slightly to provide continuity in the display output as the temperatures change. The displays can be stacked until a desired broad range of temperatures is achieved. The displays can be arranged to form symbols, as in FIG. 1B, so that as the temperature changes, different images appear on the displays.

A. Substrates

The substrate or the lower-most display layer of this invention will normally be a stable, solid material. Substrates can include but are not limited to wood, rubber, plastic, glass, metal and cotton. Preferable substrates are latex formulations, e.g., octyl acrylate, dimethylstyrene, vinyltoluene, hexyl acrylate, styrene, butyl acrylate, chloroprene, butadiene, vinylidene chloride, ethyl acrylate, methyl methacrylate, vinyl chloride, vinyl acetate, methyl acrylate, acrylonitrile and acrolein. The preferred substrates are polyesters. Other illustrative substrates include polyester condensation polymers, such as polyethylene terephthalate and polycarbonate, addition polymers, such as ABS polymers (acrylonitrile-butadienestyrene), fluorocarbons, e.g. Kel-F, and polyvinyl fluoride, polyolefins films, e.g. polyethylene, polypropylene, etc., cellulose esters, e.g. cellulose acetate, propionate and butyrate, polyamides, e.g. nylon and polycaprolactam, polystyrene, and copolymers.

The substrate of this invention can be transparent when used as a barrier for a lower thermochromic film layer. However, the lowermost substrate is preferably opaque, and more preferably a dark color, and most preferably black. The pigment can be either permeated into the substrate during substrate synthesis or it can be applied to the surface of the substrate with a brush, roller, silk screen, by dipping or spraying.

Metal foils may also be used as a substrate. The surface of the metal foil to which the thermochromic film layer will be applied should be blackened, e.g. anodized. Various metal films may be employed, such as aluminum, magnesium, etc.

If desired, the substrate can be adhered to any number of backing materials depending on the use of the displays. Methods of adhesion are well known in the art. Such backing materials include but are not limited to wood, cotton, plastic, foam, adhesive strips, paper, rubber and glass.

B. Thermochromic ink

The thermochromic inks of this invention consist of a thermochromic compound, a film-forming polymer, a thickening agent and other optional agents, i.e., wetting agent.

The thermochromic substance can consist of any compound that changes color upon a change of temperature within the temperature range of 0° to 100° C. A general review can be found in P. J. Collings "Liquid Crystalline Materials" in Kirk-Othmer, *Encyclopedia of Chemical Technology* (*Fourth Edition*, 15:372–409 (1995). Illustrative examples of thermochromic compounds include anthraquinone functional dyes, 3d transition-metal complexes and other 3d metal compounds, samarium sulfide compounds, di-β-naphthospiropyran, poly(xylylviologen dibromide) and urethane-substituted ETCD polydiacetylene.

The preferred thermochromic substances are thermochromic cholesteric liquid crystals. Common cholesteric liquid crystals include cholesteryl chloride, cholesteryl nonanoate, cholesteryl bromide, cholesteryl acetate, cholesteryl oleate, cholesteryl caprylate, cholesteryl oleyl carbonate, and the like.

The thermochromic substances may be microencapsulated. To microencapsulate, small droplets of thermochromic substances are coated with a protective shell consisting of water-soluble polymeric materials. Microencapsulating liquid crystals is well known in the art and is described in U.S. Pat. Nos. 3,797,297 and 3,732,119. Both patents are incorporated herein by reference. Placing barriers in between microencapsulated thermochromic substances is preferred when increased resistance to impact or adhesion to substrates is desired.

Techniques for preparing dispersed thermochromic inks are well known in the art and described in U.S. Pat. No. 4,022,706 which is incorporated herein by reference. The preferred nonencapsulated liquid crystals are first dissolved in a suitable solvent and then dispersed in a latex or some other film-forming polymer and water emulsion. The solvents employed will preferably be oxygenated polar solvents and generally have a boiling point below about 175° C., preferably below about 120° C., and particularly preferred below about 100° C., and greater than about 50° C. Illustrative oxygenated solvents include isobutanol, methyl ethyl ketone, ethyl acetate, butyl acetate, amyl acetate, methyl isobutyl ketone, and the like. A sufficient amount of solvent is employed to insure the complete dissolution of the liquid crystal composition.

The thermochromic inks of this invention include a film-forming polymer capable of forming a stable dispersion (e.g., colloidal, emulsion or solution) and is preferably a latex formulation. Commercially available latex compositions may be diluted with water or concentrated to the desired solids content, preferably about 35 to 65 percent polymer. A wide variety of anionic and nonionic lattices derived from organic addition polymers, may be employed. The addition polymers may be derived from acrylics, which include acrylic acid, methacrylic acid and their esters. Of particular interest are the acrylic lattices, substantially free of monomers other than acrylate and methacrylate esters, vinyl chloride, vinylidene chloride, and copolymers with up to 30 percent of one of the other monomers indicated previously. All of these polymers provide transparent films.

In the preferred embodiment, the thermochromic liquid crystal solution is added to the latex, which is conveniently at ambient temperature, with moderate stirring and without further heating. The thermochromic liquid crystal solution is added slowly and stirring is continued for a short time, usually of the order of 5 to 30 minutes, although longer times may be employed if desired. Stirring will generally be of the order of 200 to 3,000 r.p.m.

Thickening agents may be added to the thermochromic ink. The thickening agent can be added in sufficient amount to provide a mayonnaise-like consistency. The maximum amount of thickening agent is determined by the desired consistency for a particular application of the ink. Various thickening agents can be employed, such as the carboxylvinyl polymers and the salts thereof, e.g. sodium, sold as Carbopol resins by B. F. Goodrich Chemical Co., e.g. Carbopols 934, 940, 941, 960 and 961, salts of carboxymethylcellulose, e.g. sodium, salts of polyacrylic acid, e.g. sodium, sold as K718 by B. F. Goodrich Co., polyethylene oxides, alkyl (1 to 3 carbon atoms) and hydroxyalkyl (2 to 3 carbon atoms) cellulose, e.g. methyl cellulose and hydroxyethyl cellulose, 2-aminomethylpropanol, and the like.

If desired, wetting agents may also be included in minor amounts, particularly nonionic or anionic emulsifiers. The nonionic emulsifiers are primarily ethylene oxide and propylene oxide polymers where the end groups may be esterified or etherified. Various series of nonionic wetting agents are available under the name Emulphor, Triton, and the like. Other wetting agents include polyols, e.g. 2,4,7,9-tetramethyl-5-decyn-4,7-diol (Surfynol 104, sold by Air Products and Chemical Co.).

The resulting thermochromic ink may now be applied to the substrate or to the non-invasive barrier of a lower display by various techniques to form the thermochromic film layer. The methods include pressing with rollers, spraying, draw down blade, silk screening, rotogravure, or the like.

The thermochromic inks prepared in accordance with the subject invention can be applied by any of the above listed methods to form a symbol or design. The symbol or design can be but is not limited to, ornamental, alphabetic or numeric symbols.

C. Non-invasive barrier

The dried thermochromic film layer may be coated or covered with one or more layers of either films, laminates, paints or combinations thereof, preferably transparent but can be pigmented. Various films, laminates, etc. may be brushed, sprayed or otherwise employed, such as acrylates, or lattices, which may be active, semi-reactive or reactive, vinyl chloride polymers and copolymers, vinylidene chloride polymers and copolymers, acrylic polymers and copolymers, vinyl acetate polymers and copolymers, cellulose esters, and the like. These polymers are compatible with and will form strong bonds with the thermochromic dye layer.

D. Multilayered displays

To construct the multilayered display of FIG. 1, the thermochromic ink is applied to the substrate with any method described above, preferably by silk screening or knife coating. After the thermochromic ink has dried to a film, the non-invasive barrier is applied, preferably painted on as with a brush, knife, roller or spray gun. When the barrier has dried, the next layer of thermochromic ink, responsive to a different range of temperatures than the first ink, is applied to the barrier of the first layer. The alternating applications of thermochromic inks and barriers are performed until the number of displays is achieved.

The top layer may optionally be different than the barrier material to increase the systems resistance to environmental damage. For example, a polyester covering is a preferred final layer owing to its exceptionally wear resistant properties.

The order in which the displays are manufactured is not critical. It is often convenient to begin with the formation of the top layer and to proceed with a subsequent layering of the next display until the substrate is laid down.

EXAMPLES

The following examples are offered by way of illustration and not by way of limitation.

Example 1

Animation

Because of the multiple layers, each with its own temperature range, animation can be developed. The displays of thermochromic liquid crystal films can be stacked so that as the temperature changes, different images or poses appear.

Example 2

"Sweet spot" locator

Another use of multilayered dispersed thermochromic liquid crystals is as a "sweet spot locator" on golf clubs. The impact of the ball against the displays creates a rise in temperature. This increase in temperature will cause a change in color at the point of impact. This visible pattern tells the golfer how close the ball is to hitting the "sweet spot" of the club.

Stacked displays are required because the outdoor temperature is not constant. Three particular displays exhibit overlapping color play between 75° and 105° F. Since the impact increases the temperature by at least 5° F., these particular stacked displays will show an image when the environmental temperature is between 70° and 100° F. Low temperature stacked displays have been made which operate from 40° to 70° F.

The stacked displays have a thin rubber backing to insulate them from the club face which would act as a heat sink, draining the thermal pattern too quickly from the displays.

The "sweet spot locator" normally withstands 100 strokes without delamination or deterioration. Both the dispersed thermochromic liquid crystals and the clear barrier layers are flexible and are not affected by the impact.

The clear layers used in this case are latex film forming mixtures. The first layer, next to the rubber backing, is a latex formulation with black pigment to allow visualization of the color change.

All patents, patent applications and publications mentioned herein, both supra and infra, are hereby incorporated by reference.

Although the foregoing invention has been described in some detail by way of illustration and example for purposes of clarity of understanding, it will be obvious that certain changes and modifications may be practiced within the scope of the appended claims.

What is claimed is:

1. A stacked thermochromic display system comprising a substrate and a stack of at least two thermochromic displays wherein each display comprises:
   (i) a thermochromic film layer; and
   (ii) a transparent barrier overlaying the thermochromic film layer; wherein the displays are stacked upon each other defining upper displays and lower displays, and;
   (iii) wherein the thermochromic film layer of each display is selected to have different temperature sensitivity ranges with the proviso that the transparent barriers are not configured in such a manner as to permit visual observation of the stacked nature of the displays.

2. A stacked display system of claim 1 wherein the displays are generally planar.

3. A stacked display system of claim 1 wherein the thermochromic film layer comprises a thermochromic liquid crystal.

4. A stacked display system of claim 3 wherein the liquid crystal is a nematic liquid crystal.

5. A stacked display system of claim 3 wherein the liquid crystal is a cholesteric liquid crystal.

6. A stacked display system of claim 3 wherein the liquid crystals are dispersed in a water based emulsion.

7. A stacked display system of claim 3 wherein the liquid crystals are microencapsulated.

8. A stacked display system of claim 3 wherein the liquid crystals are mixed with a film-forming polymer.

9. A stacked display system of claim 1 wherein the thermochromic film layer comprises a thermochromic substance selected from the group consisting of anthraquinone functional dyes, 3d metal compounds, samarium sulfide compounds, di-β-naphthospiropyran, poly(xylylviologen dibromide) and urethane-substituted ETCD polydiacetylene.

10. A stacked display system of claim 1 wherein the barrier of a lower display forms the support of an upper display.

11. A stacked display system of claim 1 wherein the displays are selected to display color at temperature ranges between 0° to 100° C.

12. A stacked display system of claim 1 wherein the substrate is opaque.

13. A stacked display system of claim 1 wherein the substrate is black.

14. A stacked display system of claim 1 wherein the thermochromic film layer is a liquid crystal ink comprising an emulsion and the thermochromic liquid crystals.

15. A stacked display system of claim 14 wherein the emulsion is a film-forming polymer and water emulsion.

16. A stacked display system of claim 15 wherein the ink comprises a wetting agent.

17. A stacked display system of claim 15 wherein the ink comprises a thickening agent.

18. A stacked display system of claim 1 wherein the barrier is a water-based acrylic copolymer.

19. A stacked display system of claim 1 wherein the substrate is an opaque water-based acrylic copolymer.

* * * * *